United States Patent
Batchu et al.

(10) Patent No.: US 8,949,201 B1
(45) Date of Patent: Feb. 3, 2015

(54) SELF-REMOVAL OF ENTERPRISE APP DATA

(71) Applicant: Mobile Iron, Inc., Mountain View, CA (US)

(72) Inventors: Suresh Kumar Batchu, Milpitas, CA (US); Mansu Kim, Cupertino, CA (US)

(73) Assignee: Mobile Iron, Inc., Mountain View, CA (US)

( * ) Notice: Subject to any disclaimer, the term of this patent is extended or adjusted under 35 U.S.C. 154(b) by 0 days.

(21) Appl. No.: 14/179,216

(22) Filed: Feb. 12, 2014

Related U.S. Application Data (60) Provisional application No. 61/763,591, filed on Feb. 12, 2013.

(51) Int. Cl.
*G06F 17/30* (2006.01)

(52) U.S. Cl.
CPC .................. *G06F 17/30303* (2013.01)
USPC .......................................................... 707/692

(58) Field of Classification Search
CPC ..................... G06F 17/30156; G06F 17/30117
USPC .......................................................... 707/692
See application file for complete search history.

(56) References Cited

U.S. PATENT DOCUMENTS

| | | | |
|---|---|---|---|
| 2007/0038680 A1* | 2/2007 | Casey | 707/201 |
| 2008/0176536 A1* | 7/2008 | Galluzzo et al. | 455/414.1 |
| 2010/0169979 A1* | 7/2010 | Brown et al. | 726/26 |
| 2010/0248699 A1* | 9/2010 | Dumais | 455/414.1 |
| 2014/0006347 A1* | 1/2014 | Qureshi et al. | 707/621 |
| 2014/0007222 A1* | 1/2014 | Qureshi et al. | 726/16 |

* cited by examiner

*Primary Examiner* — Joshua Bullock
(74) *Attorney, Agent, or Firm* — Van Pelt, Yi & James LLP (57) ABSTRACT

Self-removal of enterprise application data (e.g., managed application data) is disclosed. It may be determined that a data removal condition has been satisfied. Based at least in part on the determination, data removal information may be generated for a plurality of applications including a managed set of mobile applications. The data removal information may be provided to at least a first application included in the plurality of applications. The first application may provide the data removal information to a data storage location accessible to at least a second application upon a data removal-related event.

29 Claims, 8 Drawing Sheets

SELF-REMOVAL OF ENTERPRISE APP DATA

CROSS REFERENCE TO OTHER APPLICATIONS

This application claims priority to U.S. Provisional Patent Application No. 61/763,591 entitled SELF-REMOVAL OF ENTERPRISE APP DATA filed Feb. 12, 2013 which is incorporated herein by reference for all purposes.

BACKGROUND OF THE INVENTION

Many enterprises allow employees to use their personal mobile devices for enterprise uses. This practice is often referred to as bring your own device (BYOD). A mobile device deployed in a BYOD environment may include enterprise applications, personal applications, and/or other types of applications. The enterprise applications may include and/or provide access to sensitive enterprise data. Typically, sensitive enterprise application data remains accessible on a mobile device after the mobile device and/or user no longer has enterprise access permissions (e.g., upon termination of employment). Enterprise administrators may therefore seek to remove enterprise data from an employee's personal mobile device in certain scenarios. Data removal (e.g., data wipe, erasure, etc.) techniques typically remove all data from a mobile device or only data from a specific application on a mobile device (e.g., upon deletion of the application). For example, a typical data removal operation may remove all enterprise, personal, and/or other types of data from a mobile device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Self-removal of enterprise application data (e.g., managed application data) is disclosed. In some embodiments, it is determined that a data removal condition has been satisfied. Based at least in part on the determination, data removal information for a plurality of applications comprising a managed set of mobile applications is generated. The data removal information is provided to at least a first application included in the plurality of applications. The first application provides the data removal information to a data storage location accessible to at least a second application upon a data removal-related event. In various embodiments, data may be removed from multiple managed applications in a sequence, series, parallel, and/or order.

In various embodiments, the techniques disclosed herein may help an enterprise remove data from managed application(s) (e.g., enterprise applications). For example, data associated with managed application(s) may be removed when a mobile device user no longer has permission to access the managed application content (e.g., when a user is no longer affiliated with an enterprise). The user's personal data may, however, not be impacted.

Figure 1:
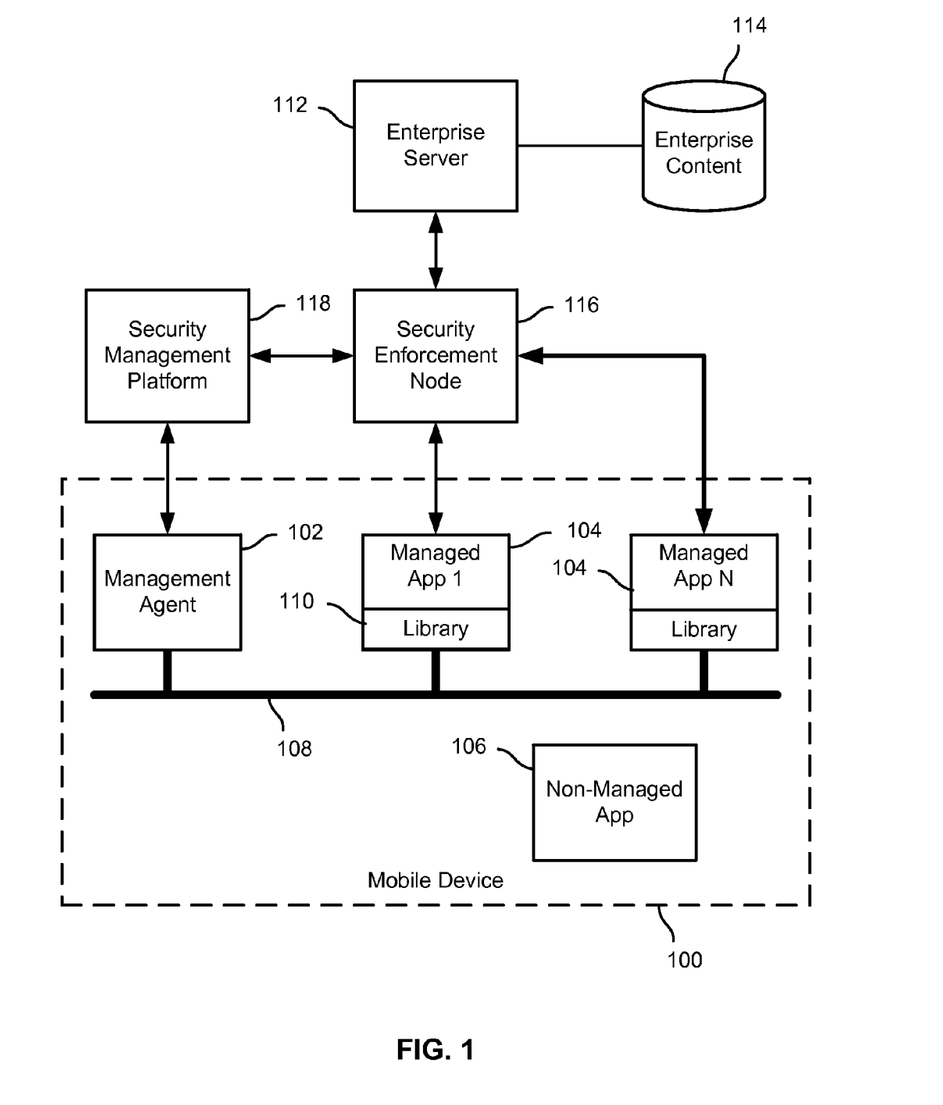
FIG. 1 is a block diagram illustrating an embodiment of a system to remove mobile application data.

FIG. 1 is a block diagram illustrating an embodiment of a system to remove mobile application data. In the example shown, a mobile device 100 (e.g., smartphone, tablet, etc.) includes a management agent 102 (e.g., a mobile device management (MDM) agent, a trusted management agent, trust client app), managed application(s) 104 (e.g., enterprise applications, managed client application(s)), non-managed application(s) 106 (e.g., personal applications, non-authorized application(s), untrusted application(s)), and/or other applications. The managed applications 104 may be associated with an enterprise (e.g., business, organization, agency, etc.). The managed applications 104 may include information sensitive (e.g., confidential) to the enterprise. In certain situations, an enterprise may wish to remove data from one or more managed applications 104.

The management agent 102, managed applications 104, and/or other components may be components of an MDM system. The management agent 102, managed applications 104, and/or other components are configured to share information/data in a trusted manner via a secure mobile application connection bus 108 (e.g., secure inter-application connection bus, secure application command bus, secure application communication bus, etc.). For example, information may be shared in a trusted manner among applications (e.g., managed applications 104) authorized to access the secure connection bus 108. In some embodiments, data may be transferred in a trusted manner among applications authorized to have access to the secure mobile application connection bus 108 by storing the data in an encrypted form in a data storage location (e.g., a paste board, clipboard, shared keychain location, and/or other storage), which is accessible to the nodes authorized to communicate via the bus 108. In various embodiments, data may be transferred in a trusted manner from a first application (e.g., the management agent 102) to a second application (e.g., a managed application 104) authorized to have access to the secure mobile application connection bus 108 by calling a uniform resource locator (URL) scheme associated with the second application (e.g., a scheme name associated with the second application) including the encrypted data.

In some embodiments, a library 110 (e.g., a data removal library, kill pill library) may be associated with a managed application 104. The library 110 may be compiled into the application 104, wrapped into the application 104, a software development kit (SDK) associated with the application 104, and/or otherwise associated with an application 104. The library 110 may modify an application's code to behave differently than a corresponding unmodified version of the application behaves. For example, the library 110 may reconfigure a managed application 104 to allow the management agent 102 to perform actions on behalf of the managed application 104 including removing data (e.g., wiping data) from the application, invoking other managed applications, accessing/storing application data, securing (e.g., encrypting) application data, invoking mobile operating system components, and/or using mobile device resources.

According to various embodiments, a library 110 associated with a managed application 104 may encrypt application data. For example, application data may be encrypted by the library 110 such that the data is only accessible (e.g., to a user, another application, the operating system, etc.) when the library, management agent, server, and/or other node uses an encryption key to decrypt the content. As discussed further below, encrypted data may be effectively removed from an application by removing (e.g., dropping) at least a portion of an encryption key, certificate, credential, and/or other encryption information necessary to the decrypt the encrypted data.

In various embodiments, a library 110 may mediate communication between a managed application 104, the management agent 102, other managed application(s) 104, and/or non-managed application(s) 106. The library 110 associated with a managed application 104 may be configured to communicate with a management agent 102, other managed applications 104, and/or other components via the secure application connection bus 108. For example, data (e.g., data removal information) may be transferred in a trusted manner from a first application (e.g., a management agent 102, managed application 104, etc.) to a second application (e.g., a management agent 102, managed application 104) by storing the data in an encrypted form in a shared data storage location. In various embodiments, data may be transferred in a trusted manner from a first application (e.g., a management agent 102, managed application 104, etc.) to a second application (e.g., a management agent 102, managed application 104) authorized to have access to the secure application connection bus by calling a uniform resource locator (URL) scheme associated with the second application and including encrypted data in the URL call. This URL scheme-based technique may also be used to invoke applications as well as to transfer information from a managed application to the management agent and/or between managed applications. In various embodiments, the library 110 may be configured to mediate the secure transfer of information (e.g., data removal information) to the managed application 104.

According to various embodiments, communications between the mobile device 100 and enterprise backend server (s) 112 (e.g., enterprise servers, file server, email server, application servers, etc.), enterprise content 114 (e.g., files, enterprise data), network resources, and/or other components may pass through a security enforcement node 116 (e.g., a reverse proxy server, sentry). In various embodiments, the security enforcement node 116 is a reverse proxy for synchronization, data transfer, and/or other traffic between managed applications 104 and enterprise servers 112 (e.g., backend servers). In some embodiments, the security enforcement node 116 may block, filter, restrict, and/or otherwise moderate a managed application 104 communication with network resources (e.g., enterprise content 114) once a data removal process has been initiated.

In various embodiments, a security management platform 118 (e.g., a virtual smartphone platform, security management server, etc.) manages polic(ies) (e.g., data removal policies), configuration(s) (e.g., application data configuration), and/or settings associated with the mobile device 100. The security management platform 118 may manage (e.g., control, dictate, determine) the configurations, policies, settings, and/or other functional aspects of one or more of the managed applications 104 on the mobile device 100. For example, the security management platform 118 may communicate with and/or execute actions on the managed applications 104 using the management agent 102 as an intermediary. Configuration changes, policy updates, setting changes, and/or commands for the managed applications 104 may be pushed to the management agent 102 for secure distribution to the applications 104. In some embodiments, the management agent 102 may, for example, connect to the security management platform 118 (e.g., on a periodic basis) to update the device 100 status, retrieve policy information, retrieve configuration information, and/or perform other operations.

In various embodiments, the management agent 102 may execute data removal operations provided by the security management platform 118. For example, data removal information (e.g., include data removal instructions, application identification information, application data removal status information, etc.) may be provided to the management agent 102 and the management agent 102 may initiate data removal from the manage applications 104. In some embodiments, data removal operations may be initiated by the management agent 102, as discussed below.

Figure 2:
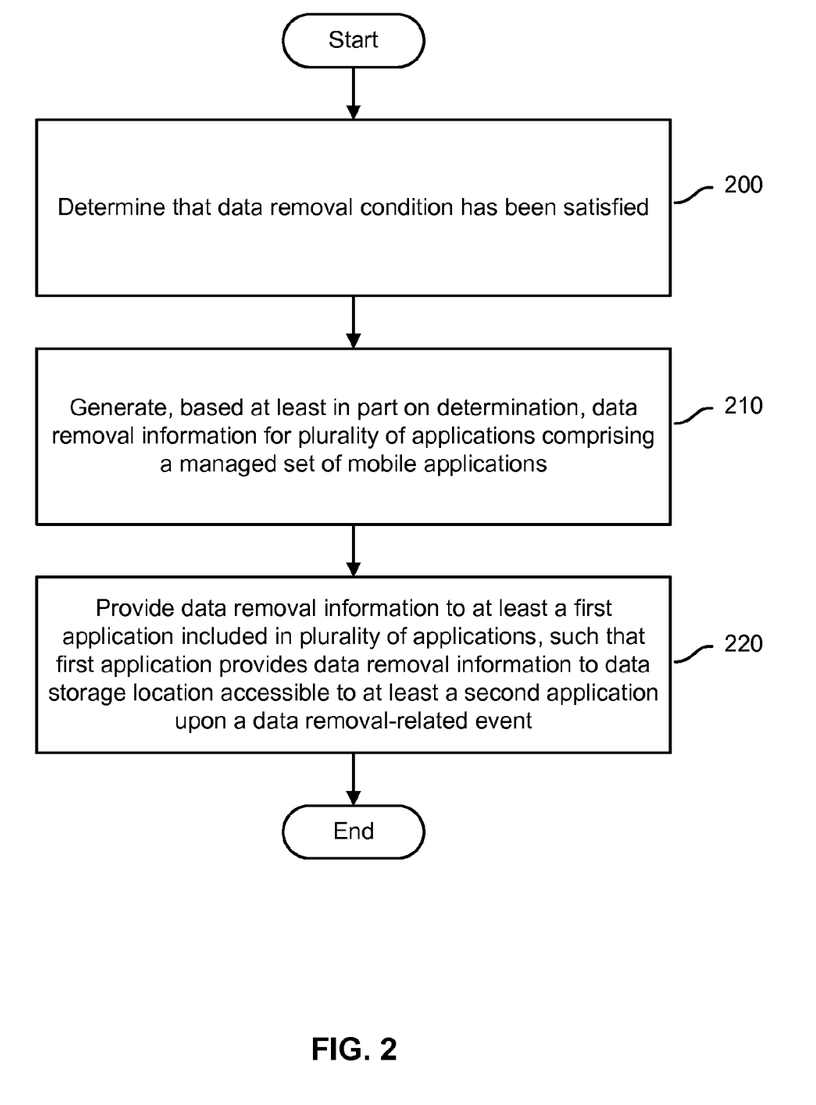
FIG. 2 is a flowchart illustrating embodiments of a process of data removal.

FIG. 2 is a flowchart illustrating embodiments of a process of data removal. In various embodiments, the process is performed by the system 100 of FIG. 1. At 200, it is determined that a data removal condition has been satisfied. According to some embodiments, it may be determined at a server (e.g., a device management server) that a data removal condition (e.g., associated with a managed set of mobile applications) has been satisfied.

In some embodiments, it may be determined, by a management agent on the mobile device that a data removal condition (e.g., associated with a managed set of mobile applications) has been satisfied. For example, a management agent may determine based on information received from a server (e.g., security management platform) that a data removal condition has been satisfied. In another example, the management agent may determine based on a policy, condition, and/or other information that a data removal condition has been satisfied.

In various embodiments, a data removal condition may include, for example, any condition that when satisfied indicates that data should be removed from a mobile device, applications associated with a mobile device (e.g., managed application), and/or other storage. A data removal condition may be, for example, a security-related condition (e.g., a security breach, threat, and/or other condition associated with a mobile device, enterprise, network, etc.), a time-based condition (e.g., a period of non-communication between a device and server), a mobile device/application use-based condition (e.g., lack of use, overuse, erratic/suspicious use patterns, etc.), and/or any other type of condition. In some embodiments, a data removal condition may be a combination of conditions (e.g., time-based condition(s), use-based condition(s), security-related condition(s), etc.).

In various embodiments, a data removal condition may include a policy associated with the managed set of mobile applications. A policy may, for example, provide that mobile device data (e.g., data associated with a managed set of applications) is to be removed (e.g., wiped) when the device has been out of contact with a server (e.g., security management platform 118 of FIG. 1 and/or another node) for a period of time (e.g., a predetermined period of time, defined period of time, calculated period of time, etc.). For example, a policy may initiate a data removal operation when a mobile device has been out of contact with element(s) of a mobile device management (MDM) platform for a day, week, and/or any other period of time. When a mobile device has not been in contact with a mobile device management platform (e.g., a server) for a period of time, it may indicate a security risk associated with the mobile device. A condition may be satisfied when a policy is satisfied, violated, etc.

In various embodiments, a data removal condition may be satisfied based on input from a user (e.g., an administrator). Input may be received via a console, portal, user interface, and/or other interface. The interface may be associated with, for example, a security management platform (e.g., an enterprise server, security management platform), a mobile device, and/or other element of an MDM architecture. In certain cases, a user (e.g., an administrator) may request that data be removed from a managed set of mobile applications, and the user (e.g., an administrator) may select a plurality of applications in the managed set for data removal. In some scenarios, an administrator may initiate data removal from a plurality of applications on the mobile device for a variety of reasons (e.g., a security issue/breach associated with an enterprise, status change of owner of device, etc.). For example, a mobile device may be owned by an employee of an enterprise, and the employee's status with the enterprise may change (e.g., the employee may quit, be terminated, etc.). As a result of the mobile device owner status change, an administrator may initiate a data removal operation (e.g., provide data removal instructions) via an interface associated with a security management platform (e.g., an enterprise server, security management platform).

At 210, data removal information for a plurality of applications including a managed set of applications may be generated. In various embodiments, data removal information may include data removal instructions, information identifying a plurality of applications including the managed set of applications, data removal status information, information including a manner of invoking each application, and/or other information associated with each of the plurality of applications in the managed set.

In some embodiments, data removal information may include data removal instructions (e.g., kill pill instructions). The data removal instructions may include commands, executables, routines, scripts, and/or other instructions. The data removal instructions may include instructions that when executed cause an application to remove at least a portion of the data (e.g., all data, use-related data) associated with the application. For example, the data removal instructions may specify which data should be removed from an application (e.g., all data, confidential data, data created/edited/accessed with a given time period, selected data, types of files, types of data, etc.). In various embodiments, the data removal instructions may, for example, command an application to reset the application to an installation configuration of the application (e.g., remove all data associated with the application to restore the application to a default configuration).

In some embodiments, the data removal instructions may identify selected data that is to be removed from an application. The selected data may be determined by the management agent, device management platform (e.g., based on a data removal policy, input from an administrator, etc.), and/or other node. In some embodiments, data removal policies (e.g., data erasure/wipe policies) may be applicable to a mobile device (e.g., applications on the mobile device), and the data removal policies may dictate which data is to be removed. For example, data removal instructions may specify that data of a particular file type (e.g., .doc., .jpeg, .mp3, and/or any file type), folder, directory, and/or application storage be removed. In another example, data removal instructions may require that data created, edited, modified, and/or stored during a period of time (e.g., within the last month, from a first time/date to a second time/date, etc.) be removed. In various embodiments, data removal instructions may require that selected data not be removed from an application. For example, certain files stored, created, and/or modified by an employee (e.g., an employee's photos, music, personal documents, etc.) may not be removed.

According to various embodiments, data removal information may include information identifying a plurality of applications in a managed set of applications. The identifying information may include, for example, a list, table, array, and/or other information including applications in the managed set of applications. For example, a list (e.g., a kill pill applications list) may include application identifiers (e.g., application bundle ID (e.g., application123.company.app), a uniform resource locator (URL) associated with an application, application name, etc.) each associated with an application in the managed set of applications. The list of applications may include, for example, all enterprise-managed applications which are to be wiped (e.g., as determined by an administrator, security management platform, management agent, and/or other entity).

In various embodiments, data removal information may include techniques and/or approaches to invoke applications (e.g., each application) included in the list of applications. For example, applications may be invoked for data removal using a variety of techniques including, for example, a URL scheme-associated approach, an approach specific to a device operating system (OS), and/or other approach(es) may be used. Using a URL scheme approach, for example, an application may be invoked using a URL scheme call, and the data removal information may be included in the URL scheme call to the application (e.g., app123://data_removal_information). In another example, data in the URL scheme call may instruct the application to retrieve data removal instructions from a secure application connection bus (e.g., a secure data storage location). In some embodiments, techniques to invoke an application may, for example, cause the application data removal instructions to be executed in the foreground and/or background. In certain operating systems (e.g., iOS), for example, data removal operations are best executed with an application running in the foreground. In other operating systems (e.g., Android), for example, data removal operations may be executed with an application running in the foreground and/or background.

According to various embodiments, data removal information may include techniques, approaches, and/or instructions to remove data from one or more applications included in the list of applications. In some embodiments, a technique to remove data from an application (e.g., a data removal technique, manner of data removal) may include instructions defining a type of data removal. For example, a data removal technique for an application may specify that data is to be removed from the application by deleting the data (e.g., from storage locations associated with the application), moving the data to another storage location, and/or perform other operations. In another example, data associated with an application may be secured (e.g., encrypted) by, for example, a library associated with the application. In this case, the data removal technique may specify that encrypted data is to be removed from the application by deleting the encryption keys, certificates, credentials, and/or other encryption information necessary to decrypt the content.

In some embodiments, data removal information may include data removal status, state, and/or posture information. Data removal status, state, and/or posture information associated with an application may include information indicating whether data associated with the application has been removed (e.g., "removal complete," erased, wiped, etc.), partially removed (e.g., "partially complete," "interrupted"), and/or not removed. For example, each application in a list of applications may be associated with a data removal state (e.g., removed, partially removed, not removed, etc.). In some embodiments, the data removal state associated with an application may be used to determine whether the application should be invoked for data removal. For example, a data removal status associated with an application may indicate that data has been removed from application, and based on this status the application would not be invoked for data removal. In another example, a data removal status associated with another application may indicate that data has not been removed from application, and based on this status the application may be invoked for data removal.

In some embodiments, data removal information may include a data removal status (e.g., a global data removal status) associated with the plurality of applications. For example, the data removal status associated with the entire data removal operation may indicate whether data removal from all applications identified in the data removal instructions has been completed. This global data removal status may include, for example, "complete," "not complete," "interrupted," and/or any other status.

According to some embodiments, data removal information may be generated at a server (e.g., security management platform) associated with a managed mobile device. For example, data removal information may generated based on input from an administrator at the server. The input may include, for example, information identifying a plurality of managed applications, data removal instructions, application invocation instructions, and/or other information.

According to various embodiments, the data removal information may be generated at the management agent. For example, the management agent may determine based at least in part on data removal polic(ies), rule(s), and/or condition(s) that data is to be removed from a plurality of applications in a managed set of applications. Based on the determination, the management agent may generate data removal information including information identifying applications (e.g., a list of applications) in the managed set. The information identifying applications may include a list of applications including, for example, the first application, second application, and/or possibly other applications from which data is to be removed.

In some embodiments, a portion of the data removal information may be generated at a server (e.g., security management platform) and another portion of the data removal information may be generated at a management agent associated with the managed set of applications. For example, the data removal information received at the management agent from the secure management platform may include a command to remove data from a managed set of applications. The management agent may, based on the data removal instructions, generate identifying information (e.g., a list of application identifiers) including a plurality of applications in the managed set of applications, a manner of invoking each application for data removal, and/or other data removal information.

According to various embodiments, data removal information may include data removal instructions to remove at least a portion of data from an application, update data removal status information associated with the application, select a next application included in the data removal information, provide the data removal information to a secure application connection bus associated with the next application, invoke the next application, and/or other perform other operations.

At 220, data removal information may be provided to at least a first application included in the plurality of applications. In various embodiments, the first application provides the data removal information to a data storage location accessible to at least a second application upon a data removal-related event.

In some embodiments, the first application may include a management agent (e.g., management agent 102 of FIG. 1) that manages application(s) in the managed set of applications, and the second application includes an application (e.g., managed application 104 of FIG. 1) in the managed set of applications. In various embodiments, the first application includes an application (e.g., managed application 104 of FIG. 1) in a managed set of applications and the second application includes another application in the managed set of applications. According to some embodiments, the first application includes an application in a managed set of applications and the second application includes a management agent.

According to some embodiments, data removal information may be generated at a server (e.g., security management platform) associated with a managed mobile device. The server may provide (e.g., push) the data removal information to a management agent associated with a set of applications from which data is to be removed. For example, the server may provide to the management agent data removal information for a plurality of applications and/or including data removal instructions. In some embodiments, the management agent may determine that data is to be removed from multiple applications (e.g., a plurality) in the managed set of applications. For example, the management agent may determine that data is to be removed from the plurality of applications based on data removal information received from a security management platform. The determination that data is to be removed from the plurality of applications may include a data removal-related event. Upon the occurrence of the data removal-related event, the management agent may select an application in the plurality of applications and may provide the data removal information to the selected application.

In some embodiments, the data removal information is provided from the management agent to at least a first managed application. The management agent may provide the data removal information to a secure application bus (e.g., secure mobile application connection bus 108 of FIG. 1) accessible to at least a first managed application. In some embodiments, the secure application bus includes a secure data storage location associated with the managed applications, and the data removal information may be provided (e.g., pushed) to the secure data storage location for retrieval by the managed applications. In some embodiments, the management agent may invoke an application in the managed set of applications using a URL scheme (e.g., scheme name) associated with the applications. For example, a URL scheme call may be generated to invoke an application identified in the data removal instructions. In various embodiments, a URL scheme call invoking an application may include instructions to retrieve data removal information from a secure application connection bus (e.g., secure data storage location). In some embodiments, a URL scheme call may include the data removal information. URL scheme-based and secure data storage location-based approaches are two possible approaches to implement secure application communication bus-associated transfer of data removal information between applications, but other approaches are of course possible.

In various embodiments, a first managed application may provide the data removal information to a second managed application upon a data removal-related event. For example, the first application may receive the data removal information, remove its application data (e.g., a data removal-related event), select a second managed application identified in the data removal information, and/or provide the data removal information to a storage location accessible to the second application.

According to various embodiments, the data removal information may be provided to multiple applications in the plurality of applications. The first application and one or more other applications may execute the data removal instructions included in the data removal instructions, and upon completion of this data removal-related event each application may provide the data removal instructions to a data storage location accessible to the management agent and/or other applications in the plurality of applications.

Figure 3:
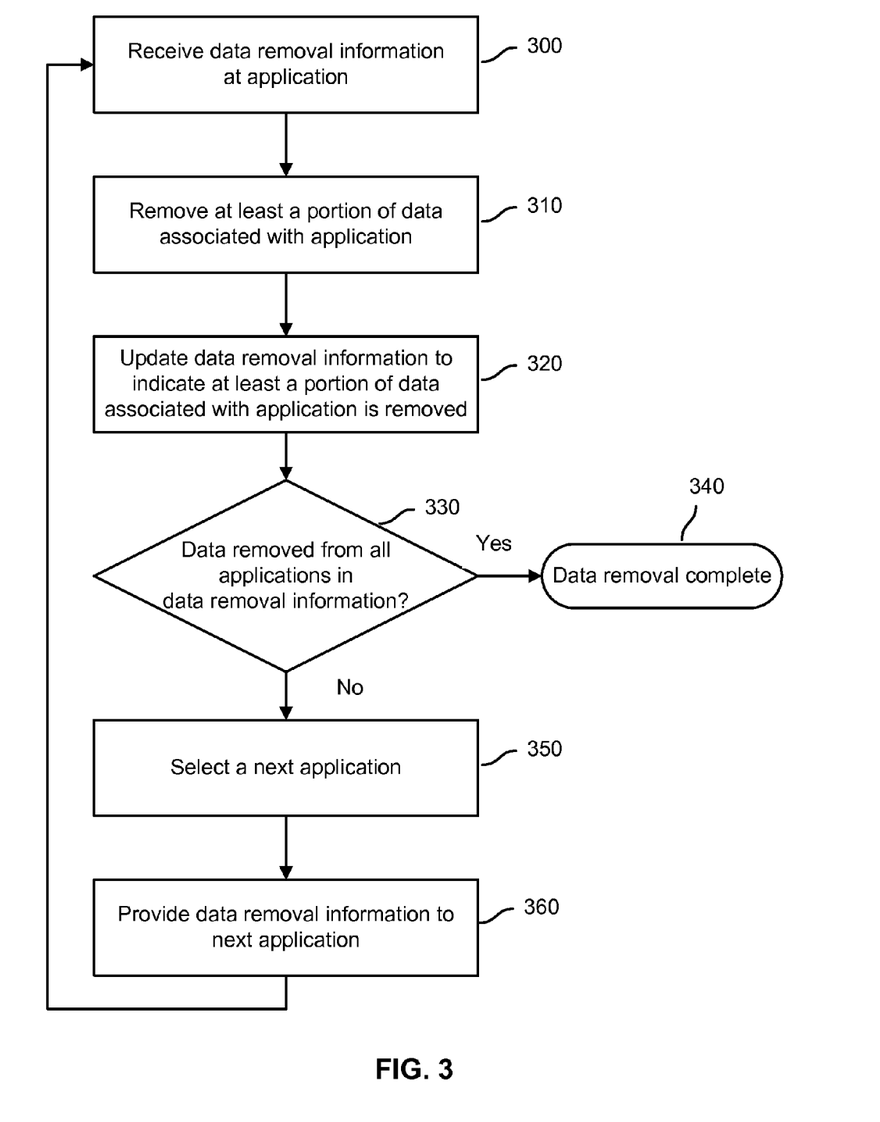
FIG. 3 is a flowchart illustrating embodiments of a process of data removal.

FIG. 3 is a flowchart illustrating embodiments of a process of data removal. In various embodiments, the process is performed by the system 100 of FIG. 1. At 300, data removal information may be received at an application (e.g., a managed application, enterprise application, etc.). According to some embodiments, a managed application (e.g., a data removal library associated with the first application) may receive (e.g., retrieve from the secure application connection bus) the data removal information. For example, the managed application may be invoked by another application, a management agent, and/or other node to retrieve data removal information from a secure application connection bus.

At 310, at least a portion of data associated with the application may be removed. In some embodiments, a library (e.g., a data removal library) associated with the application may execute data removal instructions to remove at least a portion of data associated with the application. In various embodiments, data may be removed from an application by resetting (e.g., restoring) the application to its initial state (e.g., the application state upon installation on the mobile device). For example, all data generated based on use of the application may be wiped to restore the application to its initial state. A library associated with a managed web browser application may wipe application data including, for example, cached web pages, cookies, browsing history, identities (e.g., associated with web browser users), passwords, auto-complete information, and/or other information. As another example, a library associated with a managed email application may wipe email data, attachments, contact data, profile data, and/or other data. Further, a library associated with a managed document storage application may remove all documents, selected documents (e.g., confidential documents, documents specific to the organization), and/or other data.

In various embodiments, the data removal information may identify selected data that is to be removed from an application. For example, the data removal information may specify types of data to be removed (e.g., based on file type(s), data storage locations, etc.) The data removal information may specify that data created, edited, modified, and/or stored during a period of time (e.g., within the last month, from a first time/date to a second time/date, etc.) be removed. In various embodiments, data removal instructions may restrict removal of certain data including, for example, personal files stored, created, and/or modified by an employee. Based at least in part on selected data removal policies (e.g., included in the data removal information), the library may selectively remove data (e.g., selectively wipe data) from the application.

According to some embodiments, encrypted application data (e.g., application data encrypted by a library associated with an application) may be removed by dropping (e.g., removing, revoking, deleting, etc.) the encryption key(s), certificate(s), and/or other information used to decrypt the data. For example, a library associated with an application may effectively remove encrypted data from the application by removing the encryption key necessary to decrypt the encrypted application data.

At 320, data removal information may be updated to indicate that at least a portion of the data associated with the application has been removed. In some embodiments, upon completion of a data removal operation associated with an application, a library associated with an application may update data removal status information (e.g., included in the data removal information). For example, the library associated with an application may update data removal status information to designate the application data as removed (e.g., wiped). In some embodiments, updating data removal status information (e.g., included in the data removal information) to indicate that data has been removed from the application may, for example, remove the application from the list of applications from which data is to be removed.

At 330, it may be determined whether data has been removed from all applications identified in the data removal information. In some embodiments, a library may determine whether data has been removed from all applications identified in the data removal information based at least in part on data removal status information associated with each application. In the event that data removal status information associated with each application in the plurality of applications indicates that data has been substantially, completely, and/or partially removed, the process may proceed to step 340. In the event that data removal status information associated with the applications indicates that data has not been removed from all applications (e.g., all applications slated/listed for removal), the process may proceed to step 350.

At 340, it may be determined that a data removal process is complete. In some embodiments, the management agent may be invoked upon a determination that data has been removed from each application identified in the data removal information (e.g., on the list of applications). Upon completion of data removal, an application may invoke the management agent using a URL scheme call, by providing data removal information to the secure connection bus, and/or using another approach.

In various embodiments, the management agent may retrieve the data removal information from the secure application connection bus. The management agent may, for example, process (e.g., evaluate) the data removal information to confirm that data has been removed (e.g., at least partially removed) from each application identified in the data removal information, that each application has been reset to an initial state, and/or other data removal-related operations are complete.

In some embodiments, the management agent may provide (e.g., push) the data removal information to the security management platform. For example, the management agent may provide, to the security management platform, information indicating that data is removed from all applications identified in the data removal information. The security management platform may confirm based on the data removal information that data has been removed from each of the identified applications, each of the identified applications have been reset to an initial state, and/or other operations are complete.

At 350, a next application may be selected. In various embodiments, an application (e.g., a library associated with an application) may select from the data removal information a next application for data removal. Upon substantial completion of data removal, for example, a library associated with an application may process (e.g., parse) the data removal information to select (e.g., identify) one or more applications from which data has not been removed. In some embodiments, the data removal information may indicate that data associated with multiple applications has not been removed, and an application may be selected from the multiple applications based on data removal polic(ies), algorithm(s), and/or rule(s). In certain cases, a next application may be randomly selected for data removal from, for example, a list of multiple applications from which data has not been removed.

At 360, data removal information may be provided to the next application. In various embodiments, data removal information may be provided to the next application by invoking the next application, via a secure application connection bus, and/or other approaches. For example, the data removal information may be provided to the secure application connection bus for retrieval by the next application. In some embodiments, the next application may be invoked (e.g., so that its data may be removed) using, for example, a URL scheme call associated with the next application, calling the library associated with the next application, and/or any other approach discussed herein or known in the art. When invoked, the next application may be commanded to retrieve the data removal information from, for example, the secure application connection bus.

Figure 4A:
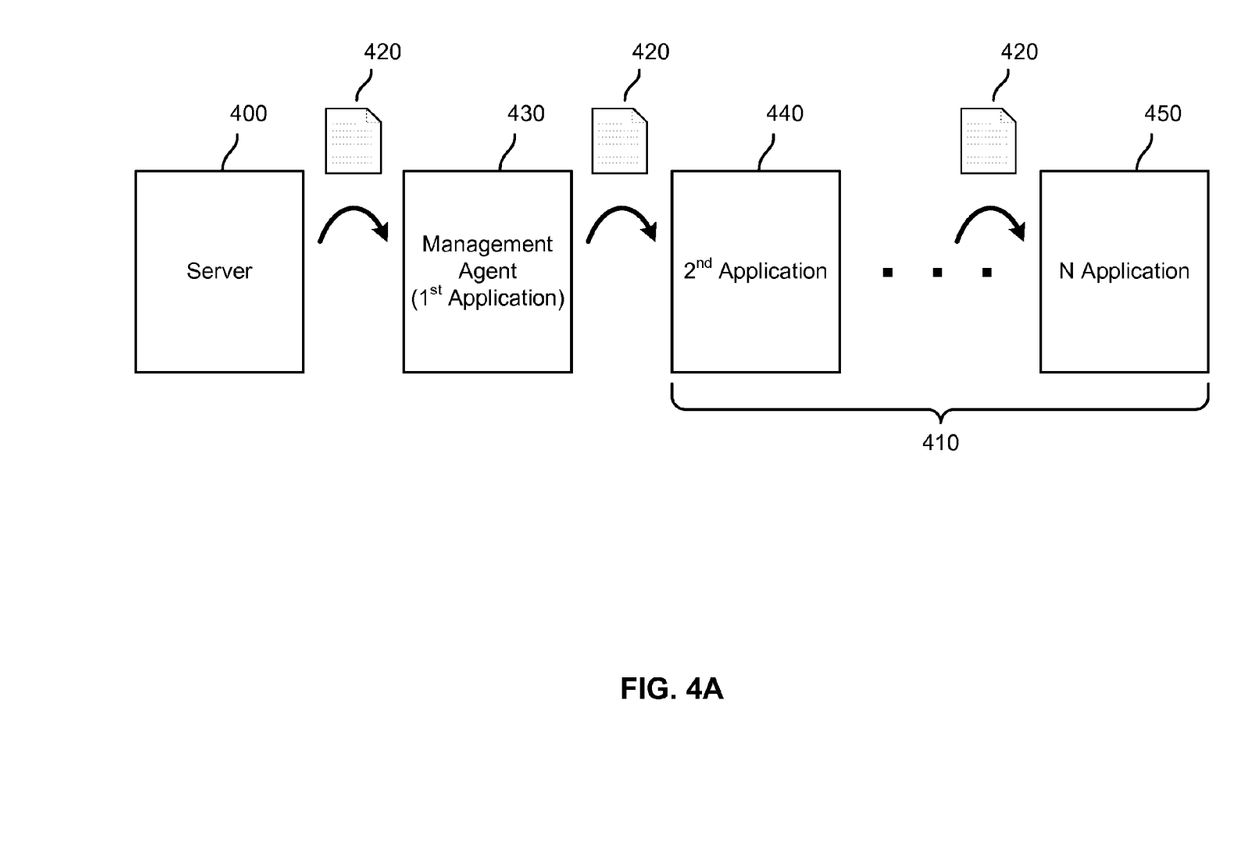
FIG. 4A is a block diagram illustrating an embodiment of a process of data removal.

FIG. 4A is a block diagram illustrating an embodiment of a process of data removal. In the example shown, a server 400 (e.g., security management platform 118 of FIG. 1) may determine that a data removal condition associated with a managed set of applications is satisfied. For example, a data removal condition may be satisfied when, for example, an administrator provides a data removal command, a list of applications, and/or other information to an interface associated with the server. In some embodiments, data removal information 420 including, for example, data removal instruction(s), information identifying a plurality of applications 410 in the managed set of applications, data removal status information, and/or other information may be generated at the server 400. The data removal information 420 may be provided from the server 400 to the management agent 430.

In some embodiments, the management agent 430 provides the data removal information 420 to an application 440 identified in the data removal information 420. The managed application 440 (e.g., a library associated with the application 440) may, for example, be invoked by the management agent 430 and/or may retrieve the data removal information 420 from the secure application connection bus. The managed application 440 (e.g., a library associated with the application 440) may process the data removal information 420 and may execute data removal instruction(s) included in the data removal information 420. For example, the library associated with the application 440 may execute data removal instruction(s) included in the data removal information and may wipe all data from the application 440 (e.g., reset the application). Upon completion of the data removal-related event (e.g., removal of at least a portion of the application data), the application 440 (e.g., the data removal library) may update the data removal information to include a data removal status of "complete." The application 440 may select a next application for data removal from the data removal information 420. The data removal information 420 may be provided to the next application (e.g., to a data storage location accessible to the next application), the next application may remove its data as instructed in the data removal information, and/or the next application may update its data removal status. The data removal information 420 may be provided to another application, and this process of sequential, ordered, and/or pattern-based data removal may be repeated until a final application 450 (e.g., an Nth application) identified in the data removal information 420 has removed data. In some embodiments, the management agent 430 may be invoked upon completion of the data removal operation associated with the final application 450.

Figure 4B:
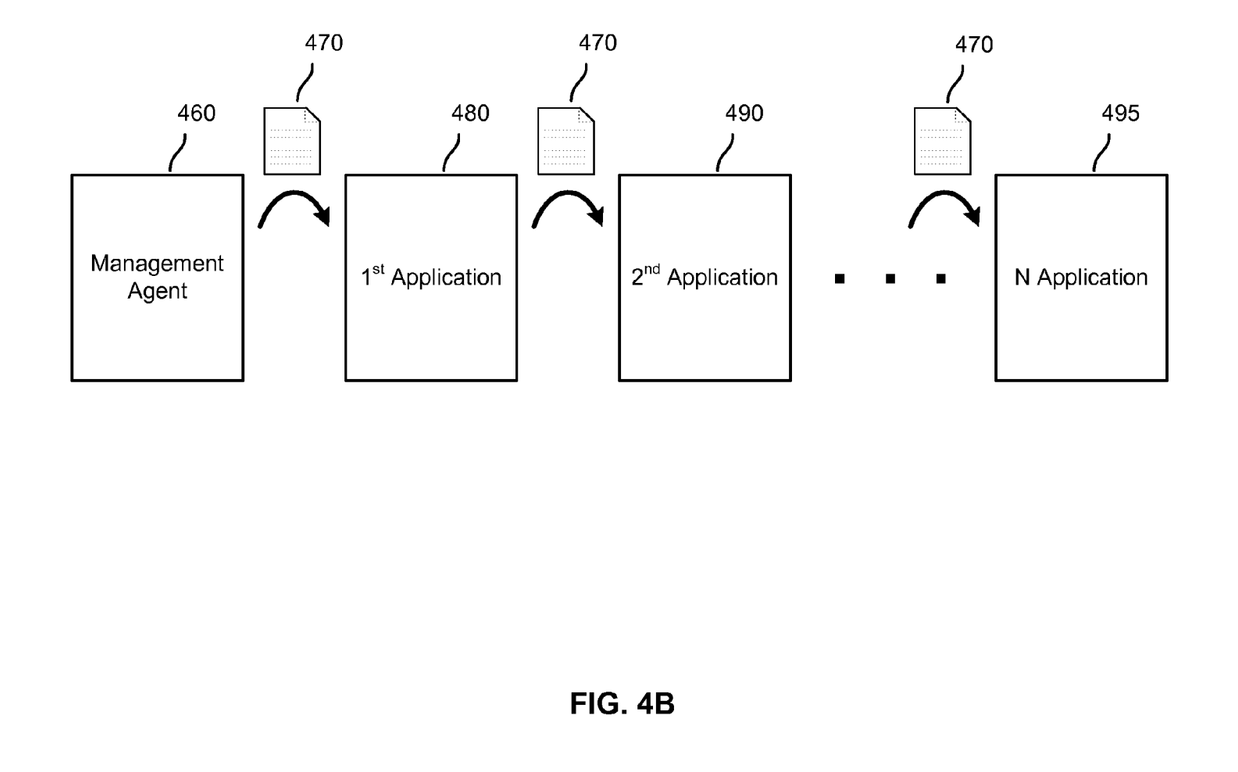
FIG. 4B is a block diagram illustrating an embodiment of a process of data removal.

FIG. 4B is a block diagram illustrating an embodiment of a process of data removal. In the example shown, a management agent 460 may determine that a data removal condition associated with a managed set of applications is satisfied. For example, a data removal condition may be satisfied, for example, when the management agent 460 determines that the mobile device has been out of contact, for example, with a security management platform for a period of time (e.g., a predetermined period of time). The management agent 460 may be woken up (e.g., when a user opens and/or attempts to open a managed application), and the management agent 460 may determine that a prescribed time has passed, contact with a security management server cannot be established, and/or another data removal condition has been satisfied. Based on this determination, a data removal process may be initiated. The management agent 460 may generate data removal information 470 based at least in part on the determination, and the data removal information 470 may be provided to a first application 480 identified in the data removal information 470. The first application 480 may retrieve the data removal information 470, remove data from the first application 480 (e.g., as instructed in the data removal command(s)), update the data removal information 470 (e.g., to include a data removal status of "complete" for the first application), select a next application (e.g., the second application 490), and/or provide the data removal information to the second application 490. This process may be repeated until data has been removed from a last application 495 identified in the data removal information 470. In some embodiments, the management agent 460 may be invoked upon completion of the data removal operation associated with the final application 495.

Figure 5:
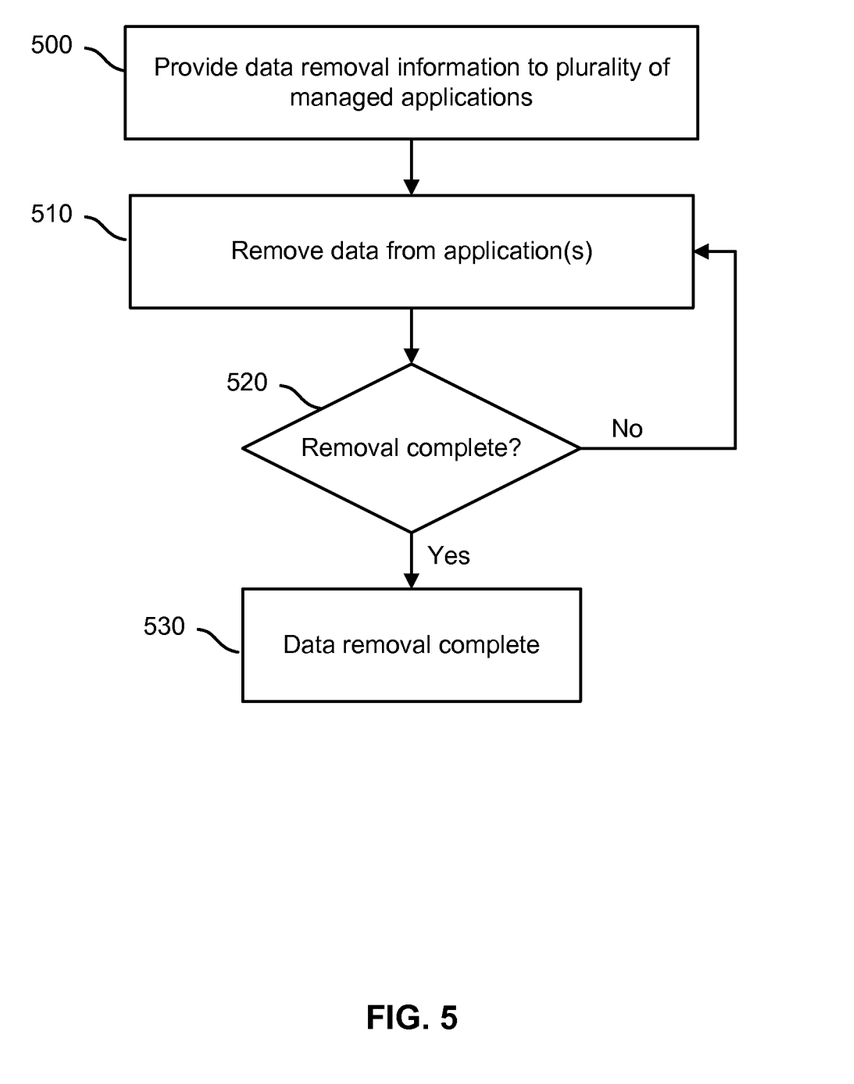
FIG. 5 is a flowchart illustrating embodiments of a process of data removal.

FIG. 5 is a flowchart illustrating embodiments of a process of data removal. In various embodiments, the process is performed by system 100 of FIG. 1. At 500, data removal information may be provided (e.g., simultaneously, substantially simultaneously) to a plurality of applications. For example, the management agent may provide the data removal information to secure application connection bus(es) (e.g., secure data storage location(s)) associated with multiple applications in the managed set of applications. In various embodiments, the multiple applications may retrieve the data removal information from the secure application connection bus.

At 510, data may be removed from the plurality of applications. In some embodiments, two or more applications may retrieve (e.g., receive) data removal information and may execute data removal instructions included in the data removal information. For example, multiple applications may execute data removal operations simultaneously (e.g., in parallel).

At 520, it may be determined whether a data removal operation (e.g., associated with the plurality of applications) is complete. In various embodiments, it may be determined (e.g., by the management agent, a managed application, security management platform, etc.) whether data has been removed from all applications identified in the data removal information. For example, upon completion of data removal, an application may update the data removal information stored on the secure application connection bus to indicate the data removal status for the application is complete. The application (e.g., a data removal library associated with application), management agent, and/or other node may then check the data removal information to determine whether the data removal status information associated with any of the identified applications is not complete. In the event data has been removed from all applications identified in the data removal information, the process may proceed to step 530. In the event it is determined that data has not been removed from all applications identified in the data removal information, the process proceed to step 510.

At 530, it may be determined that data removal is complete. In various embodiments, the management agent may be invoked upon a determination (e.g., by a managed application) that data has been removed from each application identified in the data removal information (e.g., on the list of applications).

Figure 6:
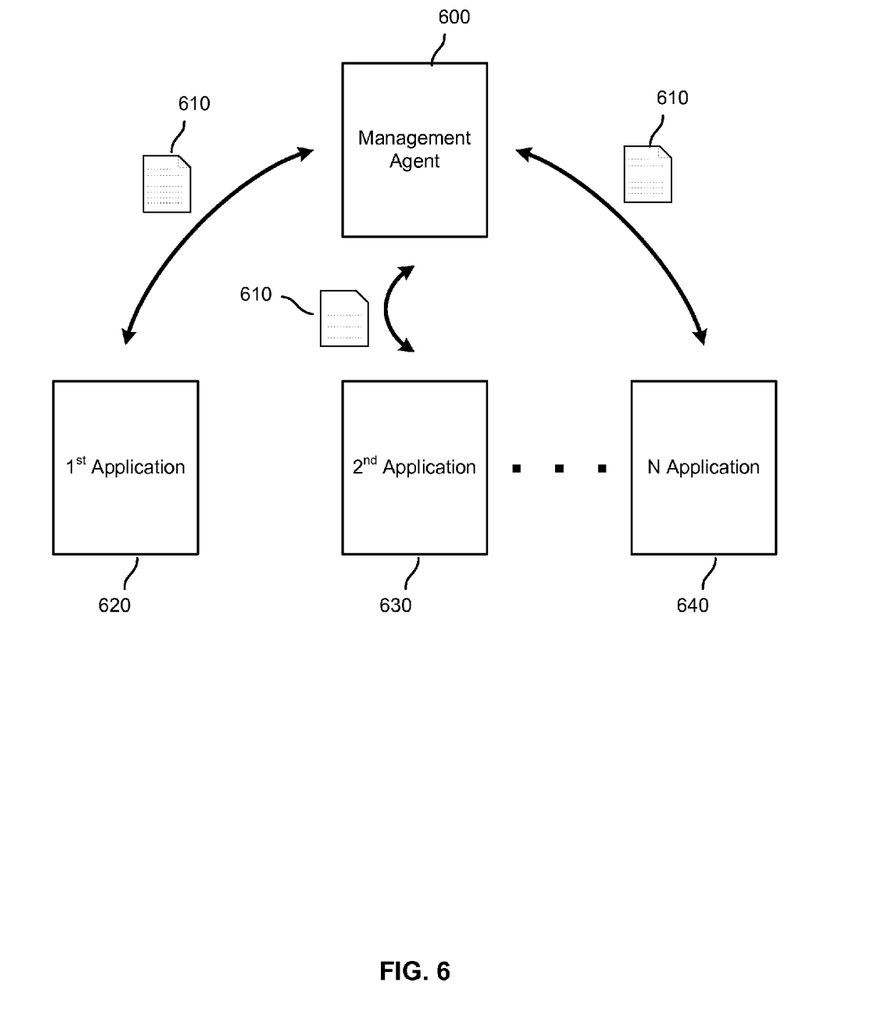
FIG. 6 is a block diagram illustrating an embodiment of a process of data removal.

FIG. 6 is a block diagram illustrating an embodiment of a process of data removal. In the example shown, a management agent 600 may determine that a data removal condition has been satisfied. Based on this determination, a data removal process may be initiated. The management agent 600, a server, and/or other node may generate data removal information 610 based at least in part on the determination, and the data removal information 610 may be provided to a first application 620, a second application 630, and/or other application(s) 640 identified in the data removal information 610. The first application 620, a second application 630, and/or other applications 640 may retrieve the data removal information 610. Each of the application(s) may remove data (e.g., as instructed in the data removal information), update the data removal information 610 (e.g., to include a data removal status of "complete"), and/or provide the data removal information to the management agent 600. In various embodiments, applications may invoke the management agent after completion of the data removal process. In various embodiments, the application(s) may execute these steps substantially simultaneously (e.g., in parallel, at substantially the same time, etc.). These process(es) may continue until data has been removed from all applications identified in the data removal information 610. For example, an application, the management agent, and/or other node may determine that data has been removed from all applications included in the data removal information. In some embodiments, the management agent 600 may be invoked upon completion of the data removal operation associated with the final application.

Figure 7:
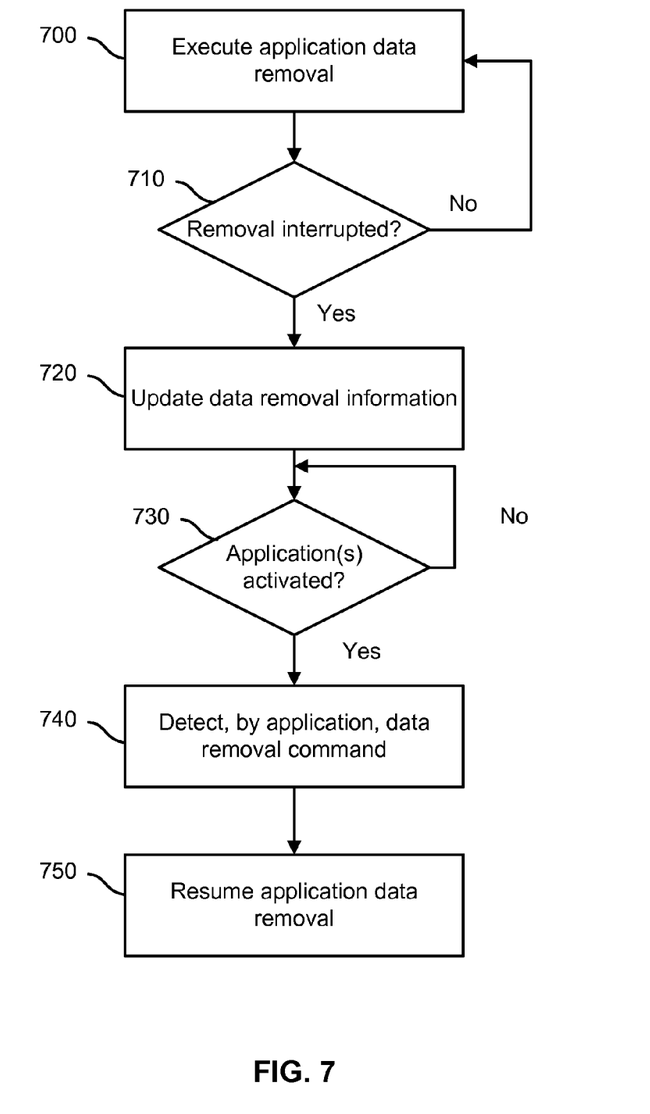
FIG. 7 is a flowchart illustrating embodiments of a process of data removal.

FIG. 7 is a flowchart illustrating embodiments of a process of data removal. In various embodiments, the process is performed by system 100 of FIG. 1. At 700, a data removal operation associated with one or more applications may be initiated. For example, data removal instructions (e.g., included in data removal information) may be executed by an application as discussed above.

At 710, it may be determined whether removal of data from the application has been interrupted (e.g., stopped). In some embodiments, a condition associated with the application, mobile device, and/or other element may indicate that the data removal process has been interrupted. For example, a user may interrupt a data removal process by opening the application, killing the application, and/or performing another action. The data removal process may also be interrupted when the mobile device powers down, receives a call, and/or at upon the occurrence of other events. In the event that a library associated with the application, the management agent, and/or other node determines that data removal has stopped prior to completion, the process may proceed to step 720. In the event it is determined that data removal has not been stopped, the application data removal operation of step 700 may continue.

At 720, data removal information may be updated. In some embodiments, the application may update the data removal information (e.g., stored on the secure application connection bus) to include a data removal status indicating that data removal is interrupted. For example, a library associated with the application may update the data removal status associated with the application to include a "not complete" status. In some embodiments, a data removal status associated with the plurality of applications and/or the mobile device may be updated to indicate that data removal was initiated but not completed successfully. The data removal information including the updated status may be stored to the secure application connection bus.

At 730, it may be determined whether a managed application has been activated. In some embodiments, an application in the managed set of applications may be opened (e.g., by a user), brought to the foreground, initiated, and/or otherwise activated. For example, any application in the managed set of applications, not just an application whose data removal process was interrupted, may be activated. In the event an application is not activated, libraries associated with managed applications, the management agent, security enforcement node, and/or other node may continue to monitor for activation of a managed application. In the event an application is activated, the process may proceed to step 740.

At 740, a data removal command may be detected. In various embodiments, a data removal library associated with the activated application may detect the data removal information (e.g., including a data removal command(s)). For example, a library associated with an application in the managed set of applications may check the secure application connection bus upon activation. The library may detect the data removal information (e.g., included data removal command(s)) stored on the secure application connection bus.

At 750, application data removal may be resumed. In various embodiments, data removal operations may be resumed by invoking an application identified in the data removal information as being not wiped (e.g., not completed), invoking the management agent to reinitiate the data removal process, and/or executing other actions. For example, a library associated with the activated application may reinitiate the data removal process based at least in part on the data removal instructions. The library may, for example, invoke for data removal an application from which data has not been removed. In various embodiments, the data removal process may then proceed at least until data has been removed from all applications identified in the data removal information.

The techniques disclosed herein provide a secure, reliable, and efficient way to remove data from multiple managed applications on a mobile device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    determining that a data removal condition has been satisfied;
    generating, based at least in part on the determination, data removal information for a plurality of applications comprising a managed set of mobile applications; and
    providing the data removal information to at least a first application included in the plurality of applications, such that the first application provides the data removal information to a data storage location accessible to at least a second application upon a data removal-related event, wherein data removal information is provided from application to application such that each application provides the data removal information to a subsequent application upon a data removal-related event until data has been at least partially removed from the plurality of applications in the managed set.

2. The method of claim 1, wherein the first application includes a management agent that manages one or more applications in the managed set and the second application includes a managed application included in the managed set.

3. The method of claim 2, wherein the data removal-related event includes a determination by the management agent that data is to be removed from the plurality of applications.

4. The method of claim 1, further comprising:
    providing, based at least in part on the data removal-related event, the data removal information from the first application to the second application;
    retrieving the data removal information at the second application; and
    removing at least a portion of data associated with the second application based at least in part on the data removal information.

5. The method of claim 4, further comprising:
    updating, by the second application, the data removal information to include an indication that at least a portion of the data associated with the second application has been removed.

6. The method of claim 5, further comprising:
    identifying, based at least in part on the data removal information, a third application in the plurality of applications; and
    providing at least a portion of the data removal information to the third application.

7. The method of claim 1, wherein the data removal information includes one or more of data removal instructions, identifying information associated with the plurality of applications, a manner of invoking one or more of the plurality of applications, and a data removal status associated with one or more applications in the plurality of applications.

8. The method of claim 1, further comprising removing, by a library associated with the first application, at least a portion of the data associated with the first application.

9. The method of claim 1, further comprising:
    retrieving the data removal information at the first application; and
    removing at least a portion of the data associated with the first application based at least in part on the data removal information, wherein the data removal-related event includes the removal of at least the portion of the data associated with the first application.

10. The method of claim 9, further comprising:
    updating, based at least in part on the data removal-related event, a data removal status included in the data removal information to indicate that data removal associated with the first application is complete; and
    providing the updated data removal information to the second application.

11. The method of claim 1, wherein the data removal-related event includes removal of at least a portion of data associated with an application.

12. The method of claim 1, wherein determining that the data removal condition has been satisfied includes receiving the data removal information from a device management server.

13. The method of claim 1, wherein providing the data removal information includes providing the data removal information from a management agent to at least a first application included in the plurality of applications, such that the first application provides the data removal information to a data storage location accessible to the management agent upon a data removal-related event.

14. The method of claim 1, wherein each application in the plurality of applications includes a library configured to remove at least a portion of data associated with the application based at least in part on the data removal information.

15. The method of claim 1, wherein providing the data removal information to a first application includes:
    providing the data removal information to the data storage location, wherein one or more of the applications in the managed set of applications are configured to retrieve information from the data storage location; and
    invoking the first application.

16. The method of claim 1, wherein data is not removed from one or more applications not included in the managed set of applications.

17. The method of claim 1, further comprising:
    determining, by an application in the plurality of applications based at least in part on the data removal information, that each application in the plurality of applications has completed data removal; and
    invoking a management agent associated with the managed set of applications.

18. The method of claim 17, further comprising confirming, by the management agent, that data has been removed from each of the plurality of applications.

19. The method of claim 1, further comprising:
    removing at least a portion of data associated with an application;
    determining that data removal has been interrupted;

updating the data removal information, based at least in part on the determination that data removal has been interrupted, to include an indication that data removal has been interrupted;

receiving an indication of use associated one or more of the plurality of applications; and invoking the first application to continue removing data associated with the first application.

20. The method of claim 1, wherein providing the data removal information includes providing the data removal information to two or more applications in the plurality of applications, such that data is removed from the applications substantially concurrently.

21. The method of claim 1, further comprising:

blocking access by at least one application in the managed set of applications to one or more network resources based at least in part on the determination.

22. A system, comprising:

a processor; and a memory coupled with the processor, wherein the memory is configured to provide the processor with instructions which when executed cause the processor to:

determine that a data removal condition has been satisfied;

generate, based at least in part on the determination, data removal information for a plurality of applications comprising a managed set of mobile applications; and provide the data removal information to at least a first application included in the plurality of applications, such that the first application provides the data removal information to a data storage location accessible to at least a second application upon a data removal-related event, wherein the data removal information is provided from application to application such that each application provides the data removal information to a subsequent application upon a data removal-related event until data has been at least partially removed from the plurality of applications in the managed set.

23. The system recited in claim 22, wherein the memory is further configured to provide the processor with instructions which when executed cause the processor to remove, by a library associated with the first application, at least a portion of the data associated with the first application.

24. The system recited in claim 22, wherein the memory is further configured to provide the processor with instructions which when executed cause the processor to:

retrieve the data removal information at the first application; and remove at least a portion of the data associated with the first application based at least in part on the data removal information, wherein the data removal-related event includes the removal of at least the portion of the data associated with the first application.

25. The system recited in claim 24, wherein the memory is further configured to provide the processor with instructions which when executed cause the processor to:

update, based at least in part on the data removal-related event, a data removal status included in the data removal information to indicate that a data removal associated with the first application is complete; and provide the updated data removal information to the second application.

26. The system recited in claim 22, wherein data is not removed from one or more applications not included in the managed set of applications.

27. A computer program product comprising a tangible non-transitory computer readable storage medium including computer instructions for:

determining that a data removal condition has been satisfied;

generating, based at least in part on the determination, data removal information for a plurality of applications comprising a managed set of mobile applications; and providing the data removal information to at least a first application included in the plurality of applications, such that the first application provides the data removal information to a data storage location accessible to at least a second application upon a data removal-related event, wherein data removal information is provided from application to application such that each application provides the data removal information to a subsequent application upon a data removal-related event until data has been at least partially removed from the plurality of applications in the managed set.

28. The computer program product recited in claim 27, further comprising computer instructions for:

removing, by a library associated with the first application, at least a portion of the data associated with the first application.

29. The computer program product recited in claim 27, wherein data is not removed from one or more applications not included in the managed set of applications.

* * * * *